(12) United States Patent
Akiyama et al.

(10) Patent No.: US 8,762,773 B2
(45) Date of Patent: Jun. 24, 2014

(54) PROCESSING APPARATUS, DATA MIGRATION METHOD, AND COMPUTER-READABLE RECORDING MEDIUM HAVING DATA MIGRATION PROGRAM RECORDED THEREON

(75) Inventors: Shigeru Akiyama, Kawasaki (JP); Yasuhiro Ogasawara, Kawasaki (JP); Tatsuya Yanagisawa, Kawasaki (JP); Kosuke Ota, Kawasaki (JP); Hitoshi Kosokabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 501 days.

(21) Appl. No.: 13/043,460

(22) Filed: Mar. 8, 2011

(65) Prior Publication Data

US 2011/0246832 A1 Oct. 6, 2011

(30) Foreign Application Priority Data

Mar. 30, 2010 (JP) ................................. 2010-078235

(51) Int. Cl.
*G06F 12/16* (2006.01)
(52) U.S. Cl.
USPC ............................................ 714/6.3; 714/6.2
(58) Field of Classification Search
USPC .................................................. 714/6.2, 6.3
See application file for complete search history.

(56) References Cited

U.S. PATENT DOCUMENTS

| 2004/0230863 | A1* | 11/2004 | Buchhorn | .......................... 714/6 |
| 2005/0283682 | A1 | 12/2005 | Odawara et al. | |
| 2006/0236056 | A1 | 10/2006 | Nagata | |
| 2006/0248295 | A1* | 11/2006 | Uchiyama et al. | ............ 711/162 |
| 2008/0052331 | A1* | 2/2008 | Ogawa et al. | .................. 707/205 |
| 2008/0126431 | A1* | 5/2008 | Walliser et al. | ................ 707/200 |
| 2008/0270372 | A1* | 10/2008 | Hsu et al. | ........................... 707/4 |
| 2009/0276565 | A1* | 11/2009 | Fujibayashi et al. | .......... 711/112 |
| 2011/0040943 | A1* | 2/2011 | Kondo et al. | .................. 711/162 |
| 2011/0179225 | A1* | 7/2011 | Flynn et al. | .................... 711/114 |

FOREIGN PATENT DOCUMENTS

| JP | 2006-4408 | 1/2006 |
| JP | 2006-301820 | 11/2006 |
| JP | 2007-310569 | 11/2007 |

\* cited by examiner

*Primary Examiner* — Chae Ko
(74) *Attorney, Agent, or Firm* — Fujitsu Patent Center

(57) ABSTRACT

By providing a unit storage area usage information calculation unit that calculates, during copy of data by a data copy control unit, usage information of a unit storage area in a storage unit that stores the data transferred from a migration source apparatus, as unit storage area usage information, and a comparison unit that compares data stored in the storage unit related to a unit storage area to be verified, selected based on the unit storage area usage information calculated, with data in the migration source apparatus related to the area to be verified, efficient and reliable data compare can be performed.

18 Claims, 19 Drawing Sheets

FIG. 4

| | TC | AC | DC | G1 | G20 | G2 | G3 |
|---|---|---|---|---|---|---|---|
| BYTE | 49,728 | 47,968 | 47,476 | 504 | 248 | 224 | 216 |
| CELL | 1,554 | 1,499 | 1,484 | 15.75 | 7.75 | 7 | 6.75 |

| CYLINDER | HEAD | TRACK USAGE (BYTES) | ERROR EVALUATION VALUE |
|---|---|---|---|
| 0000 | 00 | 30,189 | 0 |
| | 01 | 5,024 | 0 |
| | 02 | 18,286 | 0 |
| | 03 | 25,369 | 0 |
| | 04 | 18,286 | 10 |
| | 05 | 18,286 | 5 |
| | : | : | : |
| | 0D | 49,728 | 0 |
| | 0E | 4,384 | 10 |
| 0001 | 00 | 13,791 | 0 |
| : | : | : | : |

FIG. 6A

Table T2-1:

| TRACK USAGE (BYTES) | ERROR OCCURRENCE ADDITIONAL VALUE | CYLINDER | HEAD |
|---|---|---|---|
| 49,728 | 0 | 0000 | 0D |
| 30,189 | 0 | 0000 | 00 |
| 25,369 | 0 | 0000 | 03 |
| ... | ... | ... | ... |
| 18,286 | 0 | 0000 | 02 |
| 18,286 | 10 | 0000 | 04 |
| 18,286 | 5 | 0000 | 05 |
| ... | ... | ... | ... |
| 4,384 | 10 | 0000 | 0E |

FIG. 6B

Table T3 (SAMPLE COUNT):

| CYLINDER | HEAD |
|---|---|
| 0000 | 0D |
| 0000 | 00 |
| 0000 | 03 |
| ... | ... |
| 0000 | 05 |

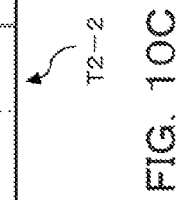

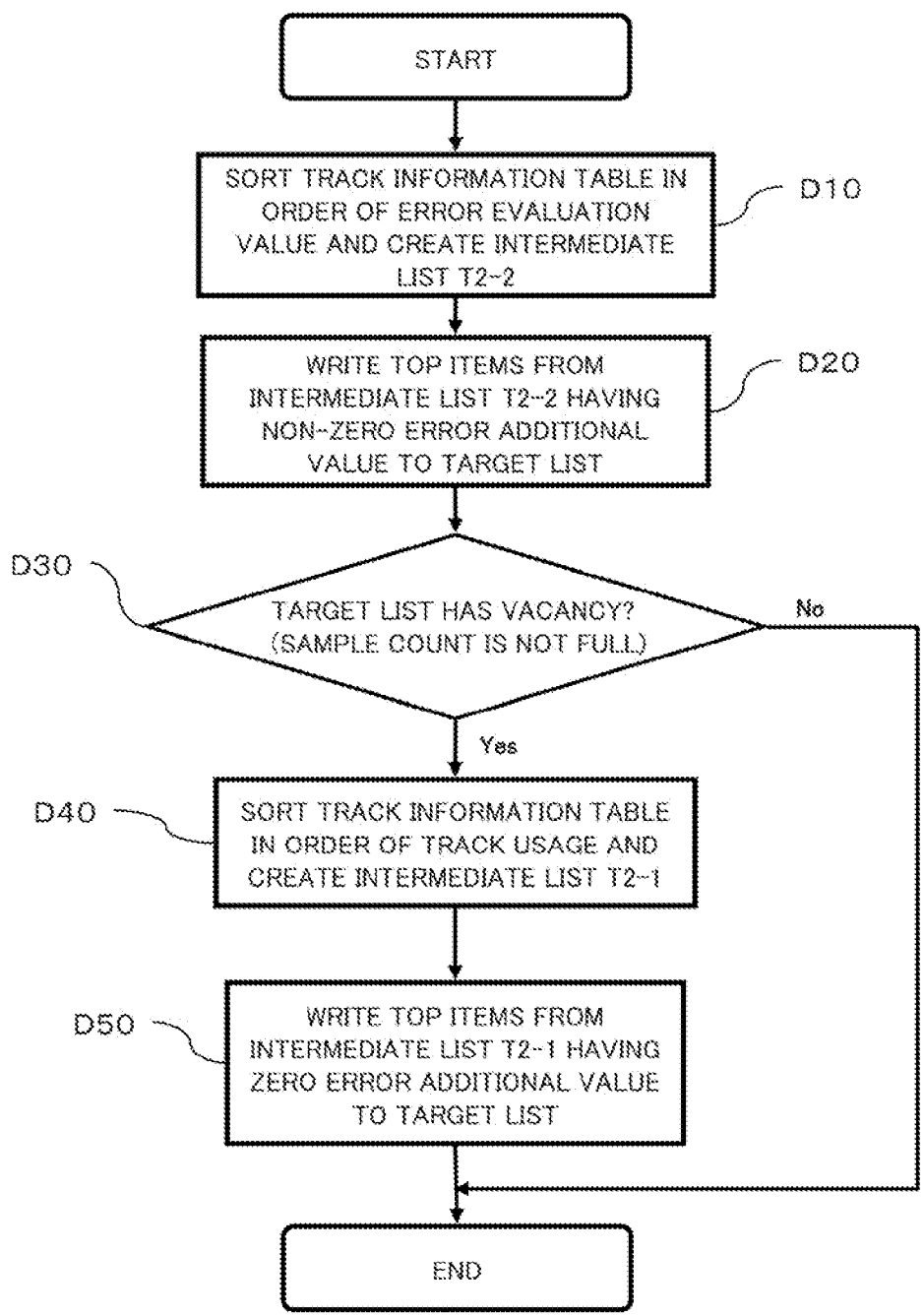

| TRACK USAGE (BYTES) | ERROR EVALUATION VALUE | CYLINDER | HEAD |
|---|---|---|---|
| 49,728 | 0 | 0000 | 0D |
| 30,189 | 0 | 0000 | 00 |
| 25,369 | 0 | 0000 | 03 |
| 18,286 | 0 | 0000 | 02 |
| 18,286 | 10 | 0000 | 04 |
| 18,286 | 5 | 0000 | 05 |
| 4,384 | 10 | 0000 | 0E |

| CYLINDER | HEAD |
|---|---|
| 0000 | 0D |
| ... | ... |
| FFFF | 09 |

← SAMPLE COUNT →

T2-n (T2-n)

| TRACK USAGE (BYTES) | ERROR EVALUATION VALUE | CYLINDER | HEAD |
|---|---|---|---|
| 49,728 | 0 | FFFF | 08 |
| 40,401 | 0 | FFFF | 02 |
| 35,220 | 0 | FFFF | 0A |
| 11,323 | 0 | FFFF | 00 |
| 9,224 | 10 | FFFF | 0E |
| 9,224 | 5 | FFFF | 01 |
| 1,024 | 10 | FFFF | 09 |

FIG. 15A

GROUP INTERMEDIATE LIST TABLE (GROUP 0)

| TRACK USAGE (BYTES) | ERROR EVALUATION VALUE | CYLINDER | HEAD |
|---|---|---|---|
| 18,286 | 10 | 0000 | 04 |
| 18,286 | 5 | 0000 | 05 |
| 18,286 | 0 | 0000 | 02 |
| ... | ... | ... | ... |
| 4,384 | 10 | 0000 | 0E |

↑ T2-51 (T2-5)

GROUP INTERMEDIATE LIST TABLE (GROUP N)

| TRACK USAGE (BYTES) | ERROR EVALUATION VALUE | CYLINDER | HEAD |
|---|---|---|---|
| 49,728 | 0 | FFFF | 08 |
| 9,224 | 10 | FFFF | 0E |
| 9,224 | 5 | FFFF | 01 |
| ... | ... | ... | ... |
| 1,024 | 10 | FFFF | 09 |

| CYLINDER | HEAD |
|---|---|
| 0000 | 04 |
| ... | ... |
| FFFF | 08 |

↙ T3

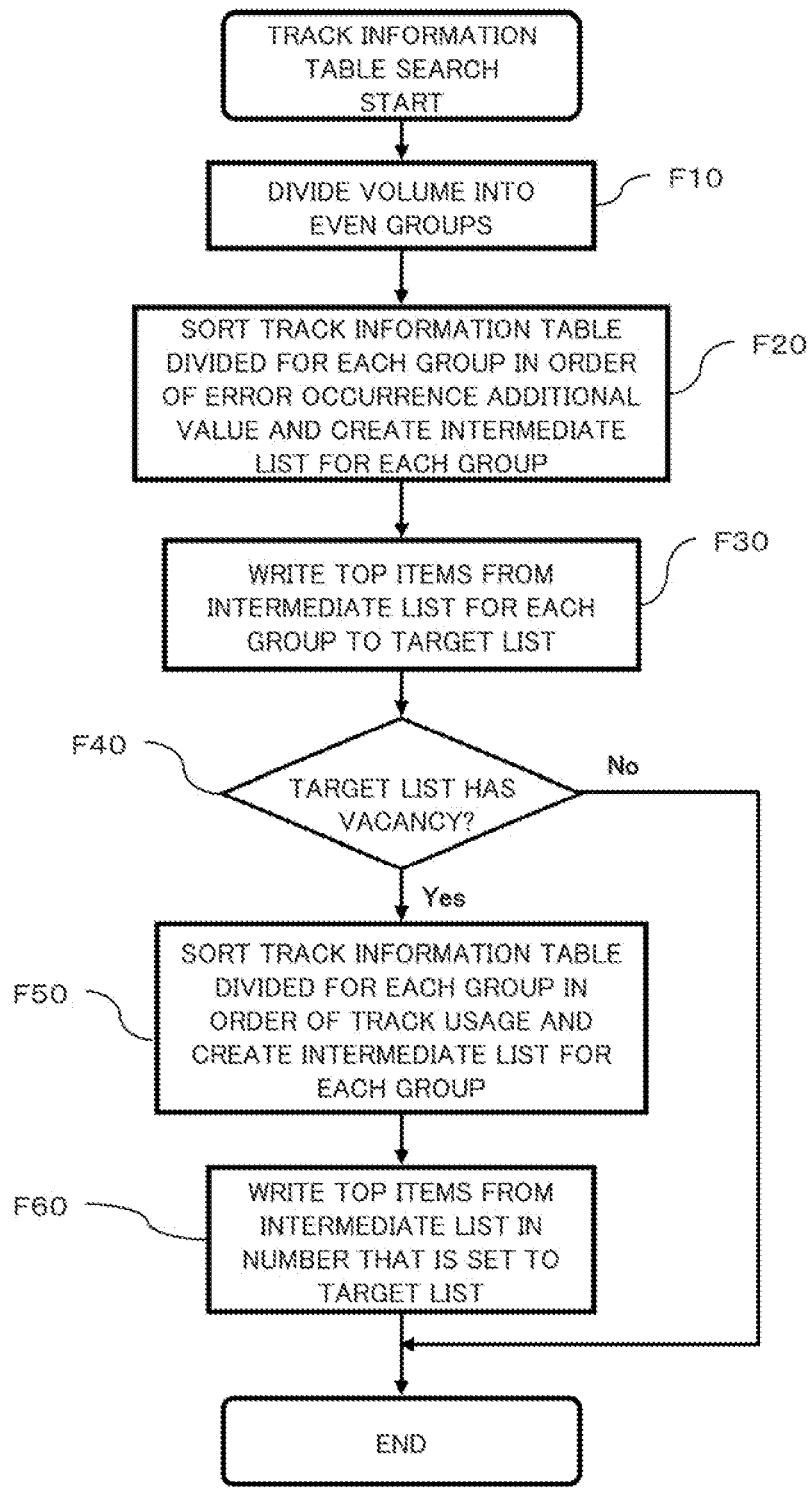

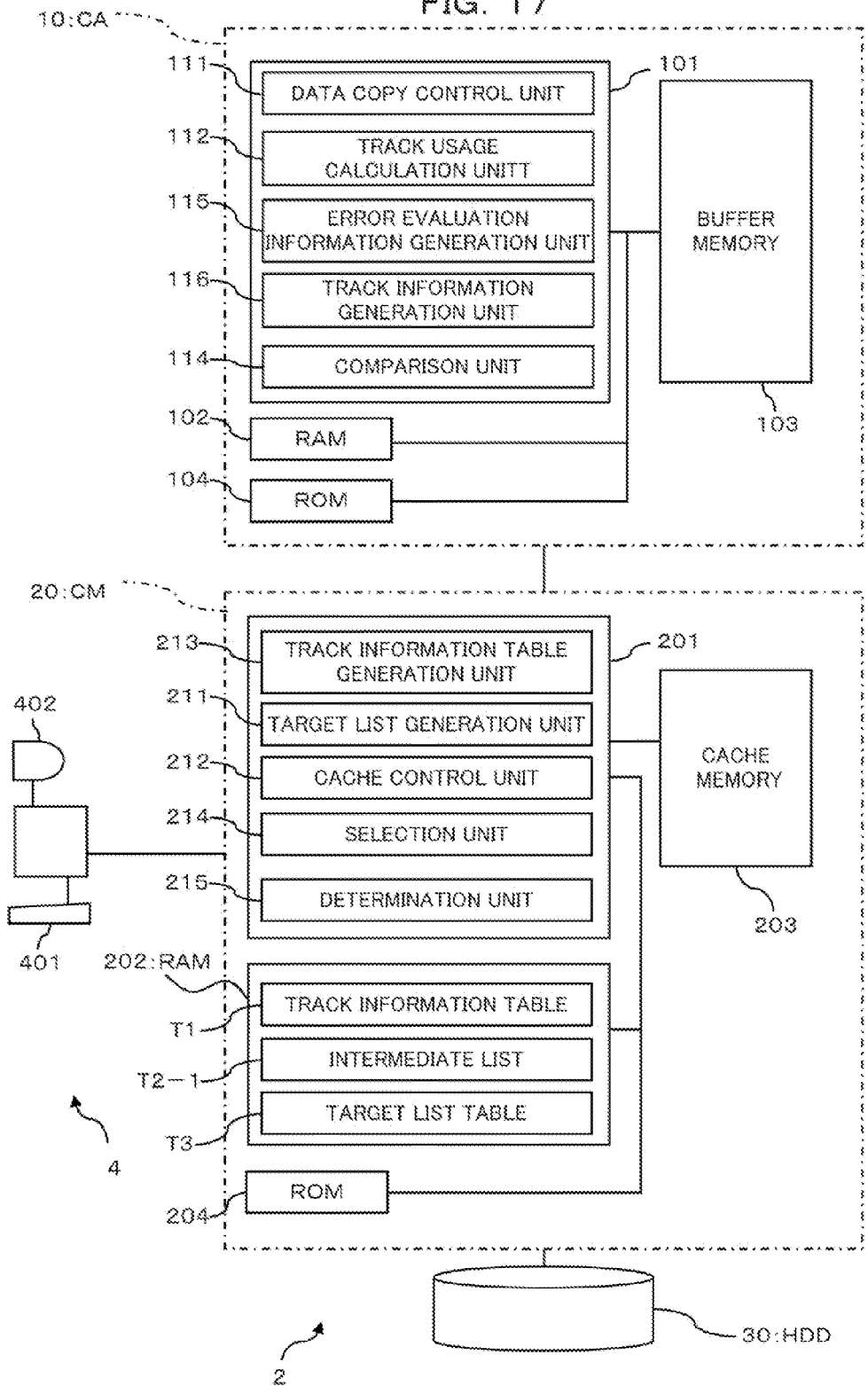

FIG. 19

VOLUME A

| CYLINDER 0 | USED AREA | ←SAMPLE CYLINDER |
| --- | --- | --- |
| ⋮ | | |
| CYLINDER 20 | UNUSED AREA | ←SAMPLE CYLINDER |
| ⋮ | | |
| CYLINDER 40 | USED AREA | ←SAMPLE CYLINDER |
| ⋮ | | |
| CYLINDER 60 | | ←SAMPLE CYLINDER |
| ⋮ | | |
| CYLINDER 80 | UNUSED AREA | ←SAMPLE CYLINDER |
| ⋮ | | |
| CYLINDER 99 | | |

VOLUME B

| CYLINDER 0 | | ←SAMPLE CYLINDER |
| --- | --- | --- |
| ⋮ | | |
| CYLINDER 20 | | ←SAMPLE CYLINDER |
| ⋮ | USED AREA | |
| CYLINDER 40 | | ←SAMPLE CYLINDER |
| ⋮ | | |
| CYLINDER 60 | | ←SAMPLE CYLINDER |
| ⋮ | | |
| CYLINDER 80 | | ←SAMPLE CYLINDER |
| ⋮ | UNUSED AREA | |
| CYLINDER 99 | | |

PROCESSING APPARATUS, DATA MIGRATION METHOD, AND COMPUTER-READABLE RECORDING MEDIUM HAVING DATA MIGRATION PROGRAM RECORDED THEREON

CROSS-REFERENCE TO RELATED APPLICATIONS

This application is based upon and claims the benefit of priority of the prior Japanese Patent Application No. 2010-078235, filed on Mar. 30, 2010, the entire contents of which are incorporated herein by reference.

FIELD

The embodiments discussed herein are related to a technique to migrate date from a migration source apparatus to a migration destination apparatus.

BACKGROUND

In server systems, a data migration may be performed when replacing devices, for example, in which data stored in a storage device is moved to another storage device (see Japanese Laid-open Patent Publication No. 2006-301820, for example).

For example such a data migration can be achieved in the following manner. A first storage device which is a data migration source is connected to a second storage device which is data migration destination, using an interface cable that is commonly used for a typical host connection. The migration destination storage device reads data and directly copies the read data, without any intervention of a host computer, so that the data is migrated to migration destination storage device.

In addition to the data copy processing for migrating data between the storage devices, data migration also involves data compare function for verifying data by comparing the original data in the migration source against the migrated data.

There are two types of comparison in a data compare function: a full data compare for comparing entire data in a volume and a sample extracting data compare for extracting sample cylinders from a volume for making comparison, for example.

A sample extracting data compare has an advantage over a full data compare, that is, the result of a data copy can be confirmed more rapidly.

In a data compare technique in a conventional data migration, sample extraction is performed by uniformly dividing a volume in steps of cylinders, and setting the first cylinders in the divided groups as cylinders to be checked.

FIG. 19 is a drawing illustrating a sample extraction technique of data compare technique in a conventional data migration.

In the sample extracting technique depicted in FIG. 19, samples are cylinders selected by uniformly dividing a volume in steps of cylinders. That is, in each of Volumes A and B, Cylinders 0, 20, 40, 60, and 80 are extracted as sample cylinders, and data compare is performed on the Cylinders 0, 20, 40, 60, and 80.

However, such a data compare technique in a conventional data migration has a problem in that data compare may be performed on unused regions in which no user data is stored, preventing a data compare from being performed efficiently.

That is, a volume has used regions in which data is stored (datasets) and unused regions in which no user data is present. Used regions in a volume can be arbitrary by a user of a system, and depicted in FIG. 19, different volumes may have different dataset arrangement. Thus, different volumes may have different arrangement of unused regions in the volumes.

For example, In the Volume A depicted in FIG. 19, Cylinders 0 to 19 and 40 to 59 are used regions while Cylinders 20 to 39 and 60 to 99 are unused regions. Similarly, in the Volume B, Cylinders 0 to 79 are used regions while Cylinders 80 to 99 are unused regions. Since no valid user data to be compared is present in the unused regions, data compare cannot provide reliable vilification. For example, in Volume A depicted in FIG. 19, reliable data compare can be performed only on two fifth of the extracted sample cylinders. Similarly, in Volume B, reliable data compare can be performed only on four fifth of the extracted sample cylinders.

Accordingly, in a data compare technique in a conventional data migration, if user data is not evenly distributed within a volume, efficient data compare may not be possible. In addition, the reliability of a data compare may be reduced if the data compare is performed on unused regions on which no valid user data is stored.

SUMMARY

Accordingly, a processing apparatus having a data migration function from a migration source apparatus, includes: a data copy control unit that controls a copy of data from the migration source apparatus; a unit storage area usage information calculation unit that calculates, during the copy of the data by the data copy control unit, usage information of a unit storage area in a storage unit that stores the data transferred from the migration source apparatus, as unit storage area usage information; and a comparison unit that compares data selected based on the unit storage area usage information calculated by the unit storage area usage information calculation unit, stored in the storage unit related to a unit storage area to be verified with data in the migration source apparatus related to the data to be verified.

In addition, a computer-readable recording medium having a data migration program recorded thereon that makes a computer execute a data migration function that performs data migration from a migration source apparatus, the data migration program makes the computer to function as: a data copy control unit that controls a copy of data from the migration source apparatus; a unit storage area usage information calculation unit that calculates, during the copy of the data by the data copy control unit, usage information of a unit storage area in a storage unit that stores the data transferred from the migration source apparatus, as unit storage area usage information; and a comparison unit that compares data, selected based on the unit storage area usage information calculated by the unit storage area usage information calculation unit, stored in the storage unit related to a unit storage area to be verified with data in the migration source apparatus related to the data to be verified.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 4 is a diagram illustrating the size of each region depicted FIG. 3;

FIGS. 6A and B are diagrams illustrating a technique to generate a target list table in a storage system as the first embodiment;

FIGS. 10A, B, C, and D are diagrams illustrating a technique to generate a target list table in a storage system as one example of a second embodiment;

FIG. 11 is flowchart illustrating a method of generating a target list table in a storage system as the second embodiment;

FIGS. 12A and B are diagrams illustrating a technique to generate a target list table in a storage system as an example of a third embodiment;

FIGS. 14A and B are diagrams illustrating a technique to generate a target list table in a storage system as an example of a fourth embodiment;

FIGS. 15A and B are diagrams illustrating a technique to generate a target list table in a storage system as an example of a fourth embodiment;

FIG. 16 is flowchart illustrating a method of generating a target list table T3 in a storage system as the fourth embodiment;

FIG. 17 is a diagram schematically illustrating a structure of a storage system as one example of a fifth embodiment;

FIG. 19 is a drawing illustrating a sample extraction technique of data compare technique in a conventional data migration.

DESCRIPTION OF EMBODIMENT(S)

Hereinafter, embodiments of a processing apparatus, a data migration method, and a computer-readable recording medium having a data migration program recorded thereon will be described with reference to the drawings.

(A) First Embodiment

Figure 1:
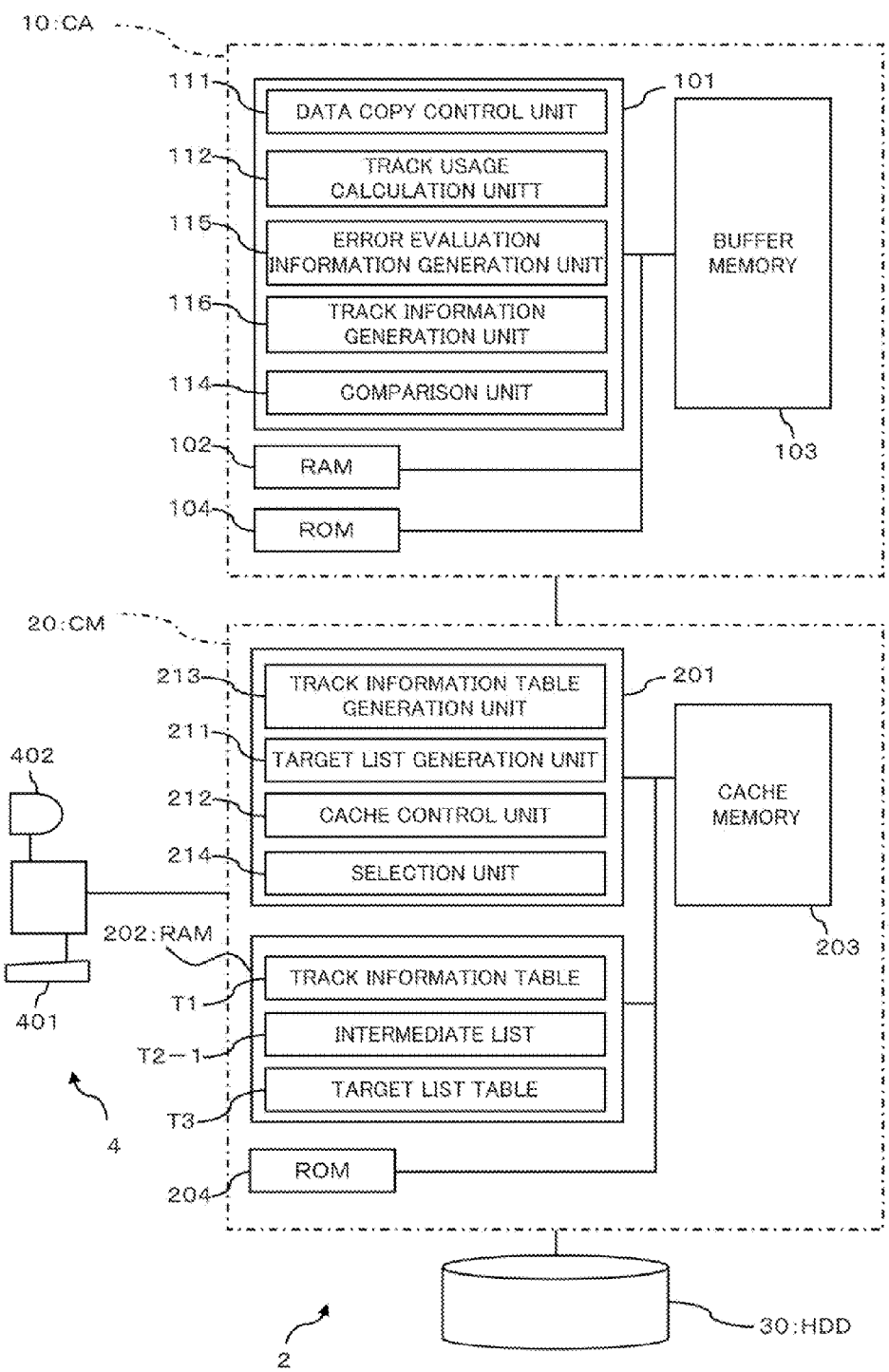
FIG. 1 is a diagram schematically illustrating a structure of a storage system as one example of a first embodiment.
Figure 2:
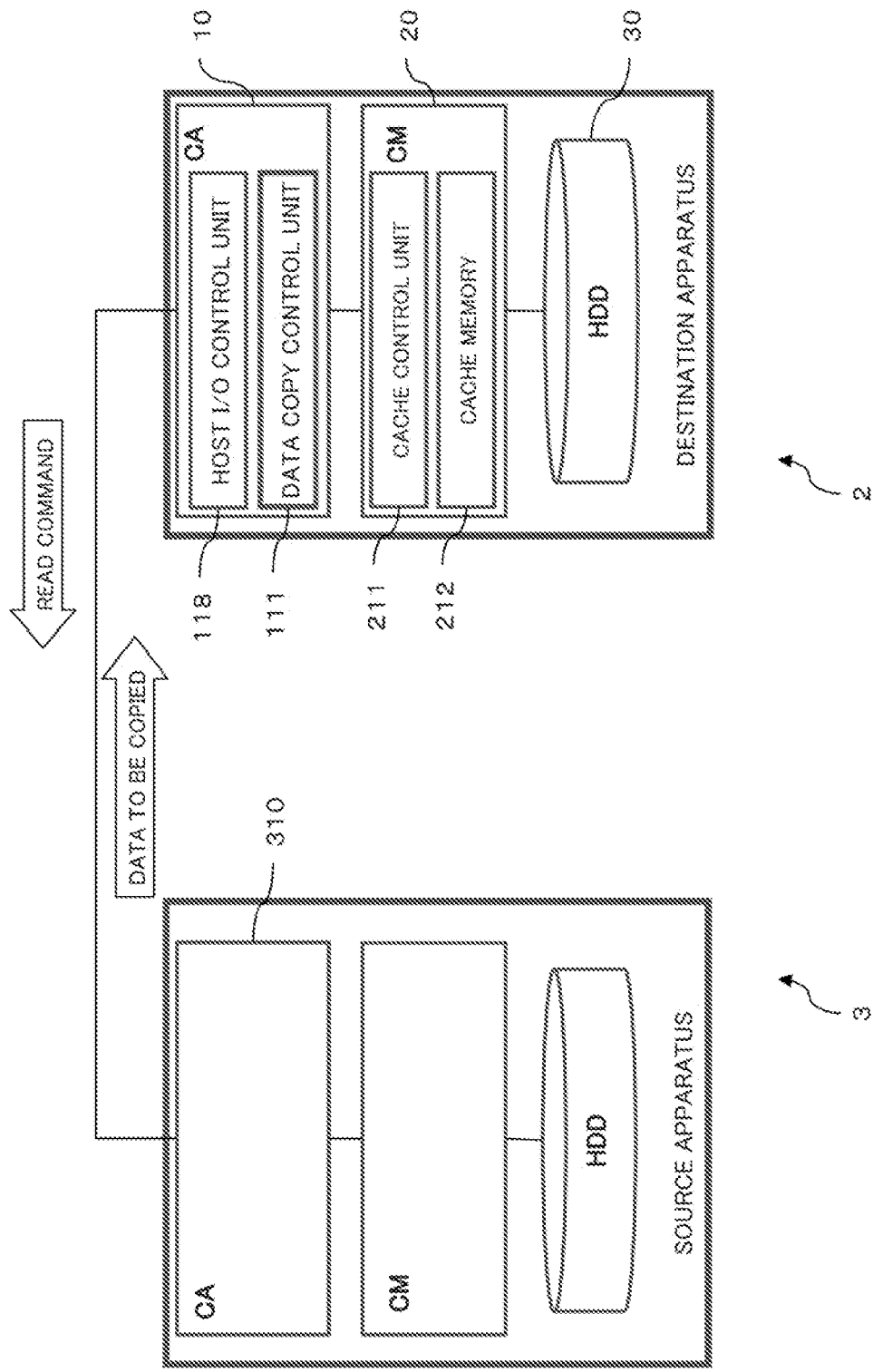
FIG. 2 is a diagram schematically illustrating a structure for executing a data migration using a storage system as one example of the first embodiment.

FIG. 1 is a diagram schematically illustrating a structure of a storage system 2 as one example of a first embodiment; and FIG. 2 is a diagram schematically illustrating a structure for executing a data migration using this storage system 2.

A storage system (processing apparatus) 2 as one example of the first embodiment is used in place of a storage system 3 (migration source apparatus: see FIG. 2) upon hardware replacement in a mainframe system, for example. If the storage system (migration destination storage system, migration destination apparatus) 2 is used in place of the storage system 3, and a data migration to migrate data in the storage system 3 to the HDD 30 in the storage system 2 is executed.

After this data migration is completed, the storage system 2 is connected to a host apparatus (not illustrated) and performs various types of processing on the HDD 30, such as date write or read, in response to a disk access command from the host apparatus.

Before executing a data migration, as depicted in FIG. 2, a CA 310 in the old storage system 3 and a CA in the storage system 2 are connected via a communication line, such as an FC (Fibre Channel) cable or a LAN (Local Area Network) cable, for example. While the data source storage system 3 and the data destination storage system 2 are communicably connected to each other, data copy processing is executed in which data for migrating (migration data) is transferred from the storage system 3 to the storage system 2 and the received migration data is stored on the HDD 30 in the storage system 2. In other words, data migration is executed without any intervention by the host apparatus (not illustrated) while the storage system 3 and the storage system 2 are connected to each other.

The storage system 2 also can execute data compare processing for confirm whether the migration data has been migrated to the storage system 2 during the data copy processing, for a data migration.

Furthermore, the storage system 2 can selectively execute data compare processing, either one of a full data compare for comparing entire data in a volume, and a sample extracting data compare in which some cylinders in the volume is selected for comparing.

Hereinafter, a sample extracting data compare will be described as a data compare function for data migration in this embodiment.

An operation terminal 4 is a terminal apparatus to which an operator enters various types of operations or instructions, and is connected to a CM 20 via a communication line, such as a LAN, for example. The operation terminal 4 includes an input device 401 and a display device 402, as depicted in FIG. 1.

The input device 401 is a device used by an operator to make various types of inputs, and is a keyboard, a mouse, and the like, for example. The display device 402 is a device on which various types of information is displayed for the operator, and is a liquid crystal display or a cathode ray tube (CRT) display, for example.

The operator issues a data copy instruction (data migration initiating instruction) using the input device 401 in the operation terminal 4. In response, a data migration is initiated, and data to be migrated is sent from the storage system 3 to the storage system 2. Additionally, data compare processing is executed after the data copy processing, in accordance with an instruction entered by the operator.

In other words, the storage system 2 functions as a data migration destination system for the data migration.

The operator enters an instruction to initiate a sample extracting data compare for the data migration, using the input device 401 in the operation terminal 4.

The storage system 2 includes a channel adapter (CA) 10, a control module (CM) 20 and a hard disk drive (HDD; storage unit) 30, as depicted in FIG. 1.

The HDD 30 is a storage unit for storing data in the manner to make it readable and writable, and functions as a data storage unit (migration destination apparatus, copy destination disk) to store data sent from the storage system 3 during a data migration. For the sake of brevity, the storage device 2 is depicted to have only a single HDD 30 in FIG. 1, FIG. 2 and FIG. 17. However, this is not limiting, and 2 or more HDDs 30 may be provided.

In this embodiment, data is recorded in the HDD 30 in accordance with the CKD (Count Key and Data) architecture In the CKD architecture, three pieces of data, i.e., a count field, a key field, and a data field, are recorded on a disk in the HDD 30.

In a count field, control information, such as a block number of the block, and lengths of a key field and a data field belonging to this block, is recorded. In a key field, key information that is searched for in a search command is written. In a data field, data (user data) to be recorded in this block is written.

In the storage device 2 adapting this CKD architecture, a group of powerful search commands are available and rapid random accesses can be achieved by using such search commands.

Figure 3:
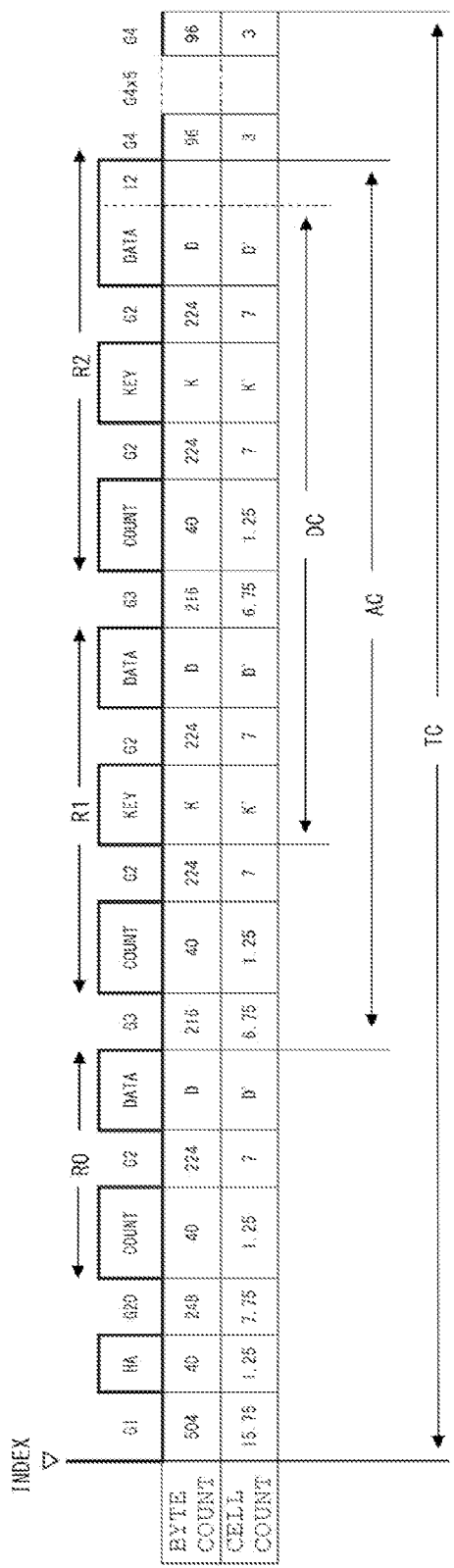
FIG. 3 is a drawing illustrating a track format in the CKD architecture.

FIG. 3 is a drawing illustrating a track format in the CKD architecture; and FIG. 4 is a diagram illustrating the size of each region depicted FIG. 3. In the CKD architecture, within a single track (CKD track), three fields, namely, a count (C), a key (K), and data (D), are provided for a single record Rn (n is a natural number of 1 or greater).

User data is stored in a field of data D in the record Rn. Hereinafter, a field of data D in the record Rn is sometimes indicated as "RnD". Similarly, a field of count C in the record Rn is sometimes indicated as "RnC", and a field of key K in the record Rn is sometimes indicated as "RnK".

In a CKD track, 49728 bytes of the track capacity is divided into cells (one cell is a block of 32-byte) to write date. Any data written on this track is made up of a home address (HA) and a record (Rn: n=0 to 93), and the record count and the byte count are user-configurable.

The HA and Rn are respectively referred to as "fields", and a gap (G) is interposed between fields. Respective gaps are indicated by a reference symbol "G" appended by a number. A gap G2 is interposed between a count and a key, and between the key and data, and a gap G3 is interposed between records.

A gap G1 and a home address HA are disposed in the beginning of a track, and multiple (five, in the example depicted in FIG. 3) gaps G4 are disposed at the end of the track. Note that an HA has a fixed length, and one HA is always written in one track.

As depicted in FIG. 4, in a CKD track, 49728 bytes of the track capacity (TC) is divided into cells (one cell is a block of 32-byte) to write date.

Note that the format depicted in FIG. 3 and FIG. 4 has been defined in the CKD specification. For example, sizes of TC (track capacity), AC, DC, G1, G20, G2, and G3 in the track format depicted in FIG. 3 has been defined as indicated in FIG. 4. Detailed descriptions of these sizes will be omitted.

In addition, a particular storage areas on the HDD 30 can be specified by a volume number, a cylinder number, and a head number.

The CA 10 is an interface controller that communicably connects to a host apparatus and the storage system 3. After the CA 10 receives data sent by host apparatus or the storage system 3 and temporarily stores it in a buffer memory 103, the CA 10 passes the data to the CM 20 or sends data received from the CM 20 to the host apparatus. In other words, the CA 10 has a function as a host input and output (I/O) control unit 118 that controls I/Os of data from and to an external device, such as the host apparatus (see FIG. 2). In addition, the CA 10 has functions as a data copy control unit 111, a track usage calculation unit 112, a comparison unit 114, an error evaluation information generation unit 115, and a track information generation unit 116, as will be described later.

The CA (processing apparatus) 10 includes a central processing unit (CPU) 101, a RAM 102, a ROM 104, and a buffer memory 103, as depicted in FIG. 1.

The buffer memory 103 temporarily stores data receive from a host apparatus or the storage system 3 and data to be sent to the host apparatus. The ROM 104 is a storage unit that stores programs executed by the CPU 101 and various types of data.

The RAM 102 is a storage area that temporarily stores various types of data and programs, and is used by the CPU 101 for temporarily storing and expanding the data and the programs when executing a program. Track information that is generated by a track information generation unit 116, which will be described later, is also temporarily stored in the RAM 102.

The CPU 101 is a processing apparatus that performs various types of computing and controls, and implements various functions by executing programs stored in the ROM 104. In other words, the CPU 101 functions as a data copy control unit 111, a track usage calculation unit 112, a comparison unit 114, an error evaluation information generation unit 115, and a track information generation unit 116, as depicted in FIG. 1.

The data copy control unit 111 is adapted to control copy of data from the storage system 3 to the storage system 2 upon executing a data migration. The data copy control unit 111 includes a channel command word (CCW) command issuance function, and issues a read command, similar to that of a host apparatus, to the storage system 3.

Note that the read command is issued based on a data copy instruction entered by operator with the input device 401 in the operation terminal 4.

The data copy control unit 111 also receives data sent from the storage system 3 in response to that read command, and passes it to the CM 20 to make it stored in the HDD 30.

The track usage calculation unit (unit storage area usage information calculation unit) 112 calculates the track usage (unit storage area usage information) of a track in which the data to be transferred from the storage system 3 to the storage system 2 is stored, upon data copy processing by the data copy control unit 111. Hereinafter, the track for which track usage is calculated is sometimes referred to as the "target track".

As used herein, the term "track usage" is the amount of data written into a CKD track, and can be used as a measure how much data is written in that CKD track. Specifically, the track usage calculation unit 112 calculates track usages using the following formula (1):

$$\text{Track usage(in bytes)} = \text{amount of user data} + \text{amount of track control information} \quad (1)$$

In the above formula, the "amount of user data" is the amount of data transferred from a migration source (in bytes). In addition, the "amount of track control information" is the amount of data for control information (track control information) added by the CA 10 or the like to the storage system 2 for writing data into a track.

The control information is a portion of data contained in COUNTs, such as gaps (G1 to G4, G20) and an HA, for example, and the sum of the byte counts such data is used as the amount of track control information. Note that the amount of data in a COUNT used as track control information is 32 bytes of the 40-byte COUNT, for example.

The track usage calculation unit 112 then records the calculated track usage in a track information table, which will be described later.

In the storage system 2, instead of using the amount of user data in the calculation, it is possible to address the change in the filling percentage with change in the record count, by adding the amount of track control information to the amount of user data, which will be described later. For the details of the CKD track (3380 format), please refer to FIG. 3 and FIG. 4.

Details of calculation of a track usage will be described.

As set forth above, in a CKD, the record count and the byte count are user-configurable variable. Since the record count and the field length of an RnD are variable and a gap is interposed between fields, a track usage can be calculated using the following formula (2).

Track usage(in bytes)=(R0C+R0K+R0D)

$$\text{Track usage (in bytes)} = (ROC + ROK + ROD) + \sum_{i=1}^{n}(RiC + RiK + RiD) \quad (2)$$

In the above formula (2), "R0C", "R0K", and "R0D" represent the lengths of fields of count C, key K, and data D in the field R0, respectively, HA=1024:G1+HA+G4×5=504+40+96×5(fixed)

R0C=288:G20+C=248+40

RnC=256:G3+C=216+40

RnK=((KL+12)/32)×32+224

RnD=((DL+12)/32)×32+224

Note that KL and DL are the key length and the data length that are actually transferred from the storage system 3 or a host apparatus, and is a variable in accordance with the data sent by the sender.

In addition, the KL and DL are rounded in the unit of a 32-byte cell before using them for calculation. Note that, in this embodiment, any fractional portion of a calculated track usage is rounded upwards. In addition, the value of 224 added for calculating the RnK and RnD is the size of the G2 gap before a field.

In addition, a track usage may be expressed by the cell count, instead of the byte count. In such a case, a track usage U expressed by a byte count is divided by 32. That is:

Track usage U'(in cells)=U/32

The track usage calculation unit 112 calculates a track usage for each track during data copy processing by the data copy control unit 111. The track usage calculated by the track usage calculation unit 112 is passed to the track information generation unit 116 for use in generation of track information.

The error evaluation information generation unit 115 carries out error information analysis and error evaluation for the data copy processing by the data copy control unit 111. More specifically, the error evaluation information generation unit 115 carries out error information analysis and error evaluation for data transfer to a target track.

The error evaluation information generation unit 115 determines, as the error information analysis, whether any error has occurred during the data transfer from the storage system 3 to the storage system 2. If the error information analysis identifies any error, the error evaluation information generation unit 115 carries out error evaluation.

The error evaluation is done by calculating an error evaluation value (error evaluation information) for each track (unit storage area) by adding error additional values corresponding to respective errors that have occurred. That is, the error evaluation information generation unit 115 calculates the error evaluation value by accumulating error additional values based on the errors that have occurred, for each track.

The error additional values have been set in advance, and different error additional values are preferably set, in accordance with the details of errors, such as error types or the points at which the errors have occurred.

For example, ten may be added as an error additional value for each media-related error (data check) that may occur during writing data into the HDD 30, and five may be added as an error additional value for each network-related error (transfer error) that may occur during a data transfer. Since retry paths are generally provided in a data transfer route in a storage system, often times, it is possible to complete the data transfer by resending the data via another path. Accordingly, weights for network-related errors can be set smaller than those for media-related errors.

By predefining different error additional values in accordance with the details of the errors in this manner, the error evaluation information generation unit 115 can provide weights based on the details of the errors. Providing weights based on the details of the errors can helps to achieve a fine-tuned error management.

In addition, the error additional value generated by the error evaluation information generation unit 115 is passed to the track information generation unit 116 and is used for generating track information, as set forth below.

The comparison unit 114 checks whether or not data related to a track to be inspected in the HDD 30 (data to be inspected) and data related to data to be inspected in the storage system 3 (original data) by comparing them. In other words, the comparison unit 114 verifies that data migration was successful by checking whether the migrated data copied to the HDD 30 and the source data stored in the storage system 3 match.

The comparison unit 114 is then notified of the track to be inspected by a selection unit 214 in the CM 20, which will be described later, and verifies the data in the notified track to be inspected.

The comparison unit 114 issues a read command to the storage system 3 for obtaining the original data corresponding to the data stored in the track to be compared, from the storage system 3. The original data obtained from the storage system 3 is stored in buffer memory 103. In addition, in the storage system 2, the comparison unit 114 issues a read instruction for reading the data to be compared against from the HDD 30 by specifying the corresponding address. The data read from the HDD 30 is also stored in the buffer memory 103.

The comparison unit 114 then compares the data read from the HDD 30 against the data from the storage system 3, both stored in the buffer memory 103, for all tracks to be compared, one by one. Note that the comparison of data by the comparison unit 114 may be implemented using various techniques well-known in the art, and the detailed descriptions thereof will be omitted for simplicity.

In addition, the result of the comparison by is sent to the operation terminal 4, and an operator is notified of the result using various technique, such as displaying a corresponding message on the display device 402, for example.

The track information generation unit 116 generates track information, based on the track usage calculated by the track usage calculation unit 112 and the error evaluation value generated by the error evaluation information generation unit 115.

The track information includes the track usage calculated by the track usage calculation unit 112 and the error evaluation value generated by the error evaluation information generation unit 115, related to information (address) identifying the location of the corresponding target track. For the sake of illustration, in this embodiment, a cylinder address and a head address are used for the addresses of a target track. However, how the target track is addressed is not limiting to cylinder addresses and head addresses. The target track may be addressed using other types of information, and a number of variations are possible. In addition, if there are multiple volumes, information for identifying a particular volume may be used, in combination with a cylinder address and a head address.

The track information generation unit 116 generates track information while data copy is performed by the data copy control unit 111. The track information generated by the track information generation unit 116 is then passed to the CM 20.

The CM (Control Module) 20 is a controller that performs various types of controls, such as controlling accesses to the HDD 30, in accordance with a storage access request (access control signal, host I/O) from an upper-level apparatus, such as a host apparatus.

In addition, the CM 20 includes a copy control function that outputs a data copy instruction to the CA 10 based on a data migration initiating instruction entered by an operator through the operation terminal 4, and a data compare control function that outputs a data compare instruction.

The CM 20 includes a CPU 201, a RAM 202, a cache memory 203, and a ROM 204, as depicted in FIG. 1.

The cache memory 203 temporarily stores data to be written to the HDD 30 passed from the CA 10, and a data read from the HDD 30.

The RAM 202 is a storage area that temporarily stores various types of data and programs, and is used by the CPU 201 for temporarily storing and expanding the data and the programs when executing a program. The ROM 204 is a storage unit that stores programs executed by the CPU 201 and various types of data.

The CPU 201 is a processing apparatus that performs various types of computing and controls, and implements various functions by executing programs stored in the ROM 204. In other words, the CPU 201 functions as a track information table generation unit 213, a cache control unit 212, a target list generation unit 211, and a selection unit 214, as depicted in FIG. 1.

The track information table generation unit 213 generates a track information table T1, based on track information generated by the track information generation unit 116.

Figure 5:
FIG. 5 is a diagram illustrating an example of a track information table in a storage system as one example of the first embodiment.

FIG. 5 is a diagram illustrating an example of a track information table T1 in the storage system as one example of the first embodiment.

The track information table T1 is a correction of track information related to multiple target tracks, and includes cylinder addresses, head addresses, track usages, and error evaluation values, related to with each other, as depicted in FIG. 5. In the example depicted in FIG. 5, cylinder addresses are indicated in the column of "cylinder", and head addresses are indicated in the column of "header". Also, in the example depicted in FIG. 5, the cylinder addresses and head addresses are sorted.

Hereinafter, cylinder addresses and head addresses in the track information table T1 are sometimes referred to as a "table address section". Information in such a table address section indicates addresses of a track in the HDD 30, and that track can be identified by these addresses. In addition, track usages and error evaluation values in the track information table T1 are sometimes referred to as a "table data section".

Every time the track information table generation unit 213 receives track information from the track information generation unit 116, it stores the track information in the track information table T1. A track information table T1 once generated is stored in the RAM 202, and is maintained at least until an instruction to execute a sample extracting data compare is issued from the operation terminal 4.

The cache control unit 212 is adapted to control write and read of data to and from the cache memory 203. The target list generation unit 211 generates a target list table (target list) T3, based on the track usage calculated by the track usage calculation unit 112.

FIG. 6A and FIG. 6B are diagrams illustrating a technique to generate a target list table in a storage system 2 as the first embodiment. FIG. 6A is a diagram illustrating an example of its intermediate list table T2-1, while FIG. 6B is a diagram illustrating an example of its target list table T3.

The target list table T3 is information indicating, for the comparison unit 114, a area for data comparison for performing a sample data extraction compare, and includes addresses of a cylinder and a head to be accessed for the data comparison, as depicted in FIG. 6B. Hereinafter, addresses of a cylinder and a head to be accessed for a data comparison are sometimes simply referred to as a "verification address". The number of verification addresses registered in the target list table T3 matches the number of data comparisons to be executed by the comparison unit 114 (sample counts).

Note that the sample count is set suitably in advance by a user, such as an operator, using the operation terminal 4, for example, considering the reliability of the system and the performance of the CPU 101 functioning as the comparison unit 114.

The target list generation unit 211 creates as many storage areas (table slots) as the sample count, and generates the target list table 13 by storing verification addresses to table slots until all of the table slots are filled.

The target list generation unit 211 generates an intermediate list table T2-1 based on the track information table T1 generated by the track information table generation unit 213, and further generates the target list table T3 based on the intermediate list table T2-1.

The intermediate list table T2-1 includes a table data section containing track usages and error evaluation values, and a table address section containing cylinder addresses and head addresses, as depicted in FIG. 6A.

The intermediate list table T2-1 is generated by sorting the above-described track information table T1 according to track usage in descending order. Note that, in the example depicted in FIG. 6A, the intermediate list table T2-1 corresponds to the track information table T1 but the table address section and the table data section are replaced.

As set forth above, the target list generation unit 211 also has a function as an intermediate list table generation unit that generates an intermediate list table T2-1. Hereinafter, an intermediate list table T2-1 is sometimes referred to as an "intermediate list T2-1".

Figure 7:
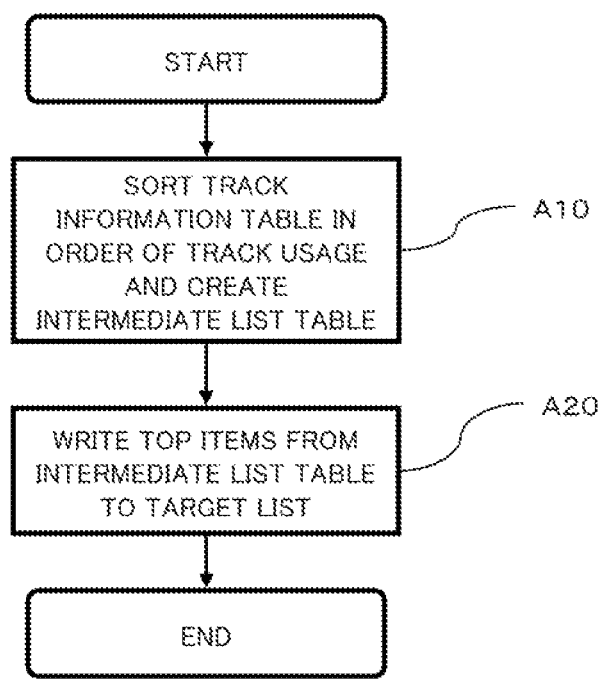
FIG. 7 is flowchart illustrating a method of generating a target list table in a storage system as the first embodiment.

The method of generating a target list table T3 in the storage system 2 as the first embodiment will be described with reference to the flowchart (A10 to A20) depicted in FIG. 7.

The target list generation unit 211 obtains a track information table T1 from the RAM 202, and generates an intermediate list 12-1 by sorting the track information table T1 in decreasing order of track usage (the item having the greatest track usage comes the first in the list) (Step A10). The target list generation unit 211 then picks up as many top items in the intermediate list table T2-1 as the sample count, i.e., selects top items according to the ranking of track usage, from the highest, and writes values in the table address section (verification address) of the selected items to recording fields in the target list table T3 (Step A20). In this manner, the target list generation unit 211 generates the target list table T3 having verification addresses of as many tracks with higher track usage as the sample count.

The selection unit 214 selects tracks to be inspected. The selection unit 214 looks up the target list table T3 generated by the target list generation unit 211, and selects the tracks enlisted in the target list table T3 as tracks to be inspected. In other words, the selection unit 214 selects tracks to be inspected, based on the track usage calculated by the track usage calculation unit 112. In addition, the selection unit 214 selects tracks to be inspected by selecting the items in the target list table T3 from the top.

In addition, the selection unit 214 notifies the comparison unit 114 in the CA 10 of the values of the table address section of the selected tracks to be inspected.

Figure 8:
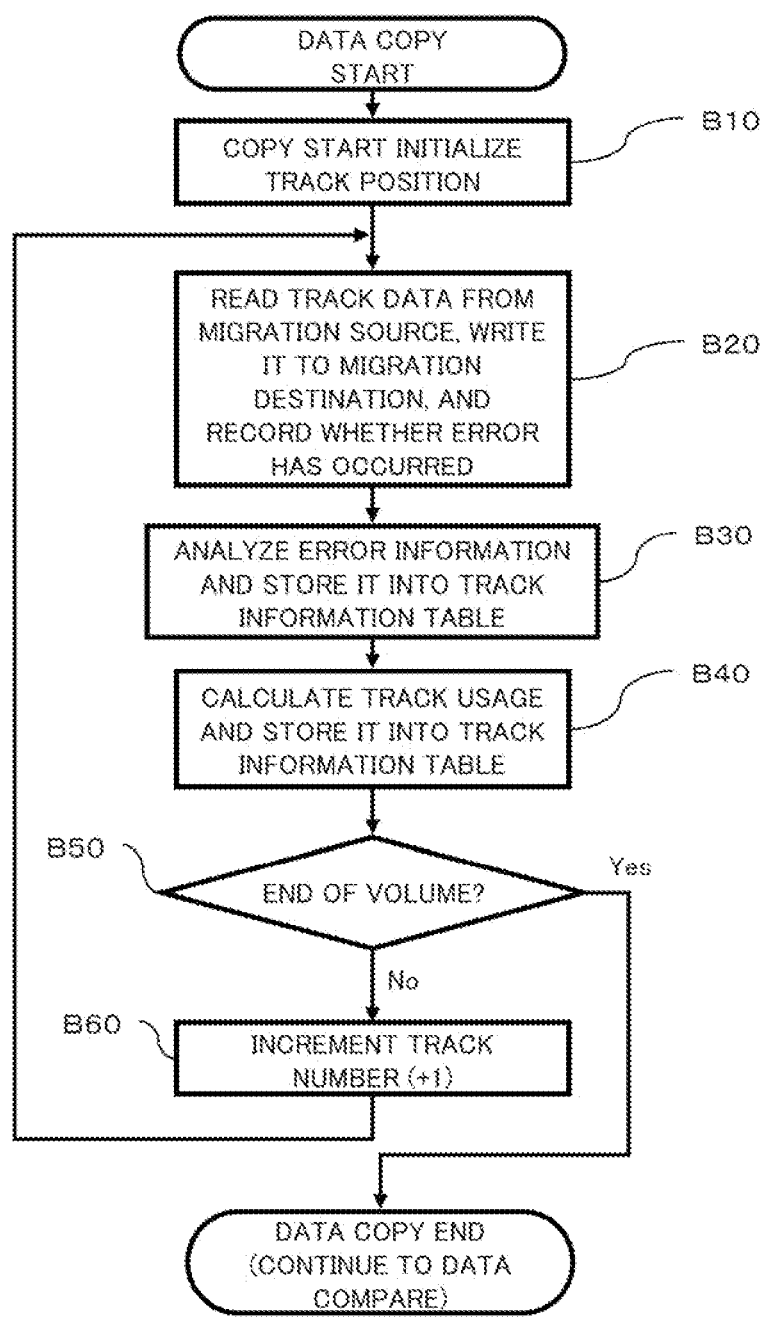
FIG. 8 is flowchart illustrating a data migration technique a storage system as one example of the first embodiment.
Figure 9:
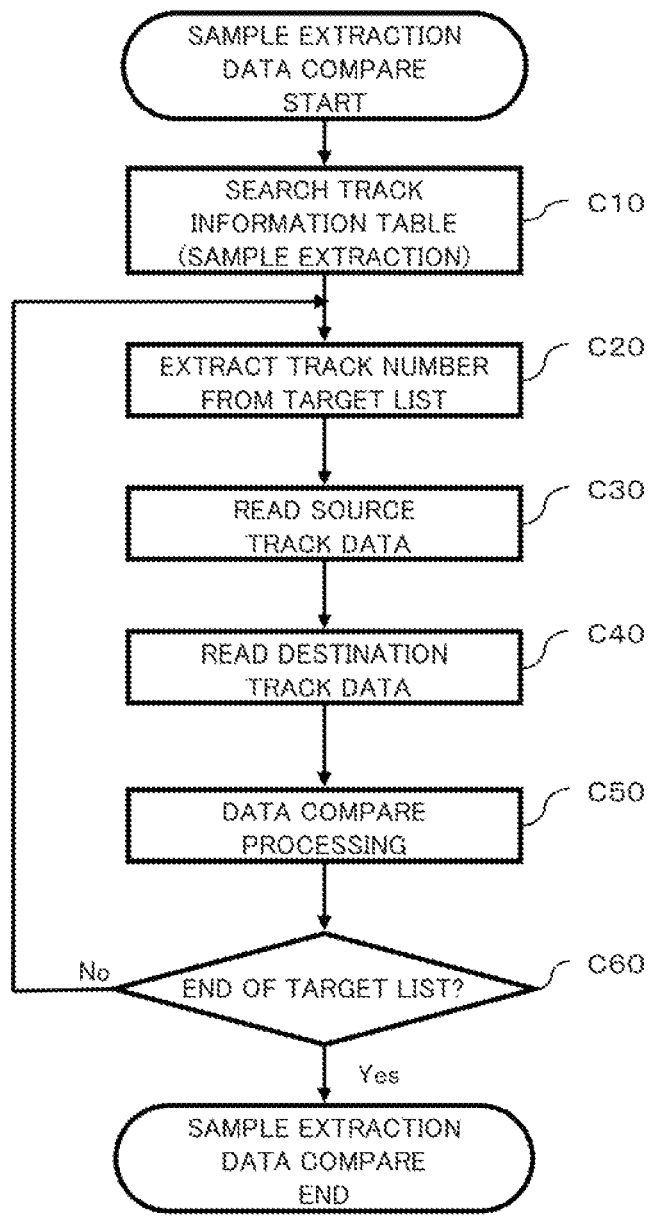
FIG. 9 is flowchart illustrating a data migration technique a storage system as one example of the first embodiment.

A data migration procedure in the storage system that is configured as described above as the first embodiment will be described with reference to flowcharts (Steps B10 to B60, and C10 to C60) depicted in FIGS. 8 and 9. FIG. 8 illustrates a data copy processing function, whereas FIG. 9 illustrates a data compare function When an operator instruct an initiation of data migration using an operation terminal 4, data copy processing is started at first.

In the data copy processing, the data copy control unit 111 in the CA 10 initializes track locations as preparation for starting copy (Step B10 in FIG. 8). Thereafter, the data copy control unit 111 reads track data from the data source storage system 3, and writes the data to the destination HDD 30 via the CM 20 in the units of tracks.

Then the data copy control unit 111 sends a read command to the storage system 3 which is the migration source. In addition, the cache control unit 212 in the CM 20 obtains, in the cache memory 203, an area (cache memory area) as a destination to write data read from the migration source.

After the data copy control unit 111 stores the track data read from the storage system 3 to the buffer memory 103, it writes it to a cache memory area obtained by the cache control unit 212. Thereafter, the data copy control unit 111 makes a data write request to a cache memory control unit 212 for writing the cached data to the HDD 30. The cache memory control unit 212 writes the track data to the HDD 30 according to this data write request.

When an error occurs during the writing, the presence or absence of the error is recorded into the RAM 102 or the like (Step B20 in FIG. 8).

The error evaluation information generation unit 115 performs an error analysis, and if an error has occurred, the error evaluation information generation unit 115 calculates an error evaluation value based on the detail of the error. In addition, the error evaluation information generation unit 115 passes the calculated error evaluation value to the track information generation unit 116, which passes this error evaluation value to the track information table generation unit 213 as track information. The track information table generation unit 213 records this error evaluation value to a track information table T1 (Step B30 in FIG. 8). If no error has occurred, an error evaluation value of "0" is recorded in the track information table T1.

The track usage calculation unit 112 calculates the track usage of the track to be transferred from the storage system 3 to the storage system 2. In addition, the track usage calculation unit 112 passes the calculated track usage to the track information generation unit 116, which passes the track usage to the track information table generation unit 213 as track information. The track information table generation unit 213 records this track usage to the track information table T1 (Step B40 in FIG. 8). Note that either Step B30 or B40 may be performed first, or alternatively, Steps B30 and B40 may be performed simultaneously.

The data copy control unit 111 checks whether all tracks in the volume involved in the data migration have been copied (Step B50 in FIG. 8). If not all of the tracks are processes (see the NO route in Step B50 in FIG. 8), the flow returns to Step B20 after incrementing the track number (Step B60 in FIG. 8).

In contrast, if data copy has been completed for the tracks in the entire volume (see the YES route in Step B50 in FIG. 8), the data copy processing is terminated to transition to data compare processing.

In the data compare processing (sample data extraction compare), the target list generation unit 211 looks up the track information table T1, and generates a target list table T3 based on the track information table T1 (Step C10).

The selection unit 214 looks up the target list table T3 to obtain a verification address (track number) from the target list table T3 (Step C20).

The comparison unit 114 issues a read command to the storage system 3, and reads, from the source storage system 3, original data (migration source data) corresponding to the data stored in the track number obtained from the target list table T3. The original data to be compared read from the storage system 3 is stored in the buffer memory 103 (Step C30).

In addition, the comparison unit 114 reads, from the HDD 30 via the CM 20, the data (migration destination data) corresponding to the data stored in the track number obtained from the target list table T3. The data to be compared read from the HDD 30 is also stored in the buffer memory 103 (Step C40).

The comparison unit 114 executes data compare processing to compare the migration source data and the migration destination data, stored in the buffer memory 103 (Step C50). If source and destination data do not match in the data compare processing, an operator is notified of this mismatch, such by displaying a corresponding message on the display device 402 in the operation terminal 4, for example.

Thereafter, it is checked whether the track that underwent the data compare is the last track in the target list table T3 (Step C60). If so (see the YES route in Step C60), the processing is terminated. Otherwise, if the track that underwent the data compare is not the last track in the target list table T (see the NO route in Step C60), the flow returns to Step C20.

Although all verification addresses registered in the target list table T3 is processes even if an error is detected in the data compare in Step C50 in the example depicted in FIG. 9 (Step see C60), this is not limiting. For example, the data compare processing may be aborted if an error is detected in the data compare in Step C50, and various modifications may be made appropriately.

As described above, according to the storage system 2 as the first embodiment, when performing sample extracting data compare related to data migration, data compare man be reliably performed on tracks in which data has been transferred by preferentially selecting tracks having greater track usages. This can prevent data compare from being performed on tracks in which data has not been transferred yet, thereby improving the efficiency of data compare. In other words, the probability of data compare can be enhanced to improve the reliability. In addition, the time required for data compare can be reduced by performing sample extracting data compare, which is highly convenient.

In addition, since track usages not only includes the data transfer amount but also the data amount of track control information that is used for system management, tracks to be verified can be selected based on the actual track usage, rather than the track format (record count). In addition, weighting by the actual byte count (byte count to be transferred) is not necessary for making this selection, data that has been actually written into tracks can be compared.

(B) Second Embodiment

FIGS. 10A, B, C, and D are diagrams illustrating a technique to generate a target list table T3 in a storage system 2 as one example of a second embodiment. FIG. 10A is a diagram illustrating an example of its intermediate list table T2-2; FIG. 10C is a diagram illustrating an example of its intermediate list table T2-1, and FIGS. 10B and D are diagrams illustrating examples of its target list table T3. Note that descriptions of the elements having the same reference symbols as the elements described previously will be emitted since they refer to the same or substantially the same elements described above.

The storage system 2 as one example of the second embodiment also includes a data migration function to migrate data in a storage system 3 to a HDD 30 in the storage system 2, similar to the first embodiment, and additionally performs data copy processing and data compare processing upon executing such a data migration.

In the storage system 2 in this second embodiment, a target list generation unit 211 generates a target list table (target list) T3 based on a track usage calculated by a track usage calculation unit 112 and error evaluation information generated by an error evaluation information generation unit 115.

Other than that, the storage system 2 in this second embodiment is configured similarly to the storage system 2 in the first embodiment, and any detailed description thereon will be omitted.

In this second embodiment, the target list generation unit 211 generates an intermediate list table T2-2 as depicted in FIG. 10A, by sorting a track information table T1 based on track usages.

The intermediate list table T2-2 includes a table data section containing track usages and error evaluation values, and a table address section containing cylinder addresses and head addresses, as depicted in FIG. 10A.

The intermediate list table T2-1 is generated by sorting the above-described track information table T1 according to error evaluation value in descending order. Note that, in the example depicted in FIG. 10A, the intermediate list table T2-2 corresponds to the track information table T1 but the table address section and the table data section are replaced. Hereinafter, an intermediate list table T2-2 is sometimes referred to as an "intermediate list T2-2".

The target list generation unit 211 then generates a target list table T3 by picking up items having error evaluation values greater than zero in the intermediate list table T2-2 according to the ranking of error evaluation value, from the highest, and writing in the table address section (verified address) of the selected items to recording fields in the target list table T3.

If the sample count of the target list table T3 is not fulfilled with the extracted items having error evaluation values greater than zero in the intermediate list table T2-2, the target list generation unit 211 then generates an intermediate list table T2-1 based on the track information table T1 (see FIG. 10C).

Similar to the first embodiment, the intermediate list table T2-1 is generated by sorting the track information table T1 according to track usage in descending order.

The target list generation unit 211 fills the target list table T3 by selecting items having greater track usages, in the order of track usage, from the highest, from the intermediate list table T2-1 and storing the verification addresses of the selected items, until all empty table slots are filled.

At this process, items in the intermediate list table T2-1 which have already been stored in the target list table T3 is rejected, such that the same verification address is not stored twice in the target list table T3.

As set forth above, the target list generation unit 211 also has a function as an intermediate list table generation unit that generates an intermediate list tables T2-1 and T2-2.

The method of generating a target list table T3 in the storage system 2 as the second embodiment will be described with reference to the flowchart (Steps D10 to D50) depicted in FIG. 11.

The target list generation unit 211 obtains a track information table T1 from the RAM 202, and generates an intermediate list T2-2 by sorting the track information table T1 in decreasing order of error evaluation value (the item having the greatest error evaluation value comes the first in the list) (Step D10). The target list generation unit 211 picks up items having error evaluation values other than zero ($\neq 0$) from the intermediate list table T2-2, and writes them in the target list table T3 according to the ranking of error evaluation value, from the highest. More specifically, the target list generation unit 211 picks up as many top items having error evaluation values other than zero in the intermediate list table T2-2 as the sample count, from the highest, and writes values in the table address section (verification address) of the selected items to recording fields in the target list table T3 (Step D20). In this manner, the target list generation unit 211 stores a target list table T3 in which verification addresses having error evaluation values other than zero are preferentially stored.

In addition, the target list generation unit 211 checks whether or not the target list table T3 has vacancy, i.e., whether the sample count is not satisfied (Step D30). If the target list table T3 has vacancy (see the YES route in Step D30), an intermediate list T2-1 is generated by sorting the track information table T1 in the order of track usage (Step D40).

The target list generation unit 211 then fills the target list table T3 by writing the table address sections of items having error evaluation values of zero in the intermediate list table T2-1 in the order of error evaluation value, from the highest, until all unfilled storage areas in the target list table T3 are filled (Step D50).

Otherwise, if the target list table T3 has no vacancy (see the NO route in Step D30), the processing is terminated.

As described above, in accordance to the storage system 2 as the second embodiment, in addition to the same advantageous effects as those of the above-described first embodiment, data compare is preferentially performed on tracks that have experienced an error during data copy processing by generating a target list table T3 in which verification addresses having error evaluation values other than zero are preferentially stored. Thereby, error locations are checked with higher priorities, improving the reliability.

In addition, since the error evaluation information generation unit 115 defines error evaluation values that are weighed in accordance with details of errors such that data compare is preferentially performed on error having higher severities, which also contribute to the improved reliability.

(C) Third Embodiment

FIGS. 12A and B are diagrams illustrating a technique to generate a target list table T3 in a storage system as an example of a third embodiment. FIG. 12A is a diagram illustrating an example of its intermediate list tables T2-31 to T2-3n (T2-3), while FIG. 12B is a diagrams illustrating an example of its target list table T3. Note that descriptions of the elements having the same reference symbols as the elements described previously will be emitted since they refer to the same or substantially the same elements described above.

The storage system 2 as one example of the third embodiment also includes a data migration function to migrate data in a storage system 3 to a HDD 30 in the storage system 2, similar to the first embodiment, and additionally performs data copy processing and data compare processing upon executing such a data migration.

In the storage system 2 of this third embodiment, a target list generation unit 211 divides a volume in a data destination HDD 30 into multiple areas (n areas where n is a natural number greater than one), and generates intermediate list tables T2-3n for the respective area. Hereinafter, each of the divided areas is sometimes referred to as a "group". In addition, in this third embodiment, the multiple groups are identified by numbers (group numbers). Note that the group count used for the division is set by an operator, using an operation terminal 4, for example.

Note that, hereinafter, when a specific one of multiple group intermediate list tables should be referred to, reference symbols T2-31 to T2-3n are used, whereas reference symbol T2-3 is used when referring to any one of multiple group intermediate list tables.

in addition, the target list generation unit 211 divides a track information table T1 into n tables so as to relate them to the generated groups, and generates group intermediate list tables T2-31 to T2-3n by sorting, based on track usages, the track information tables T1 for the respective divided groups (see FIG. 12A). In other words, each of the group intermediate list tables T2-3 is sorted according to track usage in descending order.

A group intermediate list table T2-3 includes a table data section containing track usages and error evaluation values, and a table address section containing cylinder addresses and head addresses, as depicted in FIG. 12A.

The group intermediate list table T2-3 is generated by sorting the above-described track information table T1 according to track usages in descending order. Note that, in the example depicted in FIG. 12A, the group intermediate list table T2-3 corresponds to the track information table T1 but the table address section and the table data section are replaced. Hereinafter, a group intermediate list table T2-3 is sometimes referred to as a "group intermediate list T2-3".

When a volume is divided in n areas, tracks constructing each divided area are not necessarily continuous. However, it is preferable that a volume is divided equally or substantially equally, that each area are constructing from continuous tracks, having the same or substantially same size (track count). This can facilitate generation of group intermediate list tables T2-3 from a track information table T1.

In the example depicted in FIG. 12A, tracks having the same cylinder number are grouped, and the respective group intermediate list tables T2-3 corresponding to Groups 0 to N are each constructed from tracks having the same cylinder.

The target list generation unit 211 then generates a target list table 3 by extracting tracks having greater track usages from the respective group intermediate list tables T2-3. Specifically, the target list generation unit 211 generates a target list table T3 by extracting tracks having greater usage from the highest, and storing them in storage areas in the target list table T3.

Other than that, the storage system 2 in this third embodiment is configured similarly to the storage system 2 in the first embodiment, and any detailed description thereon will be omitted.

As set forth above, the target list generation unit 211 functions as an intermediate list table generation unit that generates group intermediate list tables T2-3.

Figure 13:
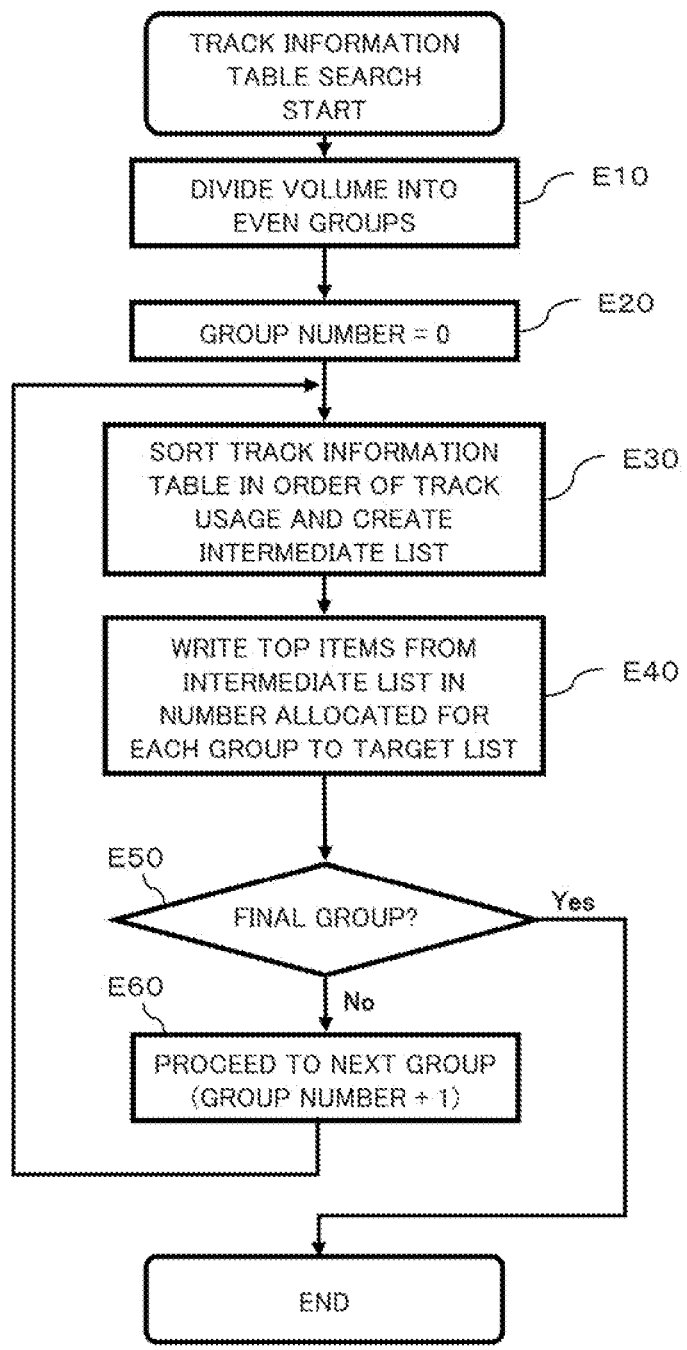
FIG. 13 is flowchart illustrating a method of generating a target list table in a storage system as the third embodiment.

The method of generating a target list table T3 in the storage system 2 as the third embodiment will be described with reference to the flowchart (Steps E10 to E60) depicted in FIG. 13.

The target list generation unit 211 creates multiple (n) groups by dividing a volume in which migration data is stored (group division) (Step E10), and assigns group numbers 0 to n to these groups. In addition, the target list generation unit 211 obtains a track information table T1 from a RAM 202.

In this step E10, the target list generation unit 211 also calculates the number of verification addresses (allocation count) for each group by dividing the sample count in a target list with the group count.

At first, the target list generation unit 211 initializes the group number (i.e., sets the group number to zero) (Step E20), and then extracts tracks for that group number from a track information table T1. The target list generation unit 211 then generates a group intermediate list T2-3 by sorting them in decreasing order of track usage, based on track information for the extract group number and track usage (Step E30).

The target list generation unit 211 then picks up as many top items in the group intermediate list table T2-2 as the allocation count, i.e., selects top items according to the ranking of track usage, from the highest, and writes values in the table address section of the selected items to recording fields in the target list table T3 (Step E40).

Thereafter, the target list generation unit 211 checks whether or not the current groups is the last group (Step E50). If the current groups is not the last group (see the NO route in Step E50), the group number is incremented (group number=group number+1) (Step E60), before proceeding back to Step E30.

Otherwise, in the case of the last group (group number=n) (see the YES route in Step E50), the processing is terminated.

As described above, in accordance to the storage system 2 as the third embodiment, the same advantageous effects as those of the above-described first embodiment can be obtained. Furthermore, a volume is divided into multiple groups to which group intermediate list tables T2-3 are generated, and a target list table T3 is generated by extracting as many pieces of track information as the allocation count from these group intermediate list tables T2-3. This can help to distribute compare areas across a volume, thereby improving the reliability.

(D) Fourth Embodiment

FIGS. 14A, B and FIGS. 15A, B are diagrams illustrating a technique to generate a target list table T3 in a storage system 2 as an example of a fourth embodiment. FIG. 14A is a diagram illustrating an example of its intermediate list table T2-41 to T2-4n (T2-4), while FIG. 14B is a diagrams illustrating an example of its target list table T3. In addition, FIG. 15A is a diagram illustrating an example of its intermediate list table T2-51 to T2-5n (T2-5), while FIG. 15B is a diagrams illustrating an example of its target list table T3. Note that descriptions of the elements having the same reference symbols as the elements described previously will be emitted since they refer to the same or substantially the same elements described above.

The storage system 4 as one example of the second embodiment also includes a data migration function to migrate data in a storage system 3 to a HDD 30 in the storage system 2, similar to the first embodiment, and additionally performs data copy processing and data compare processing upon executing such a data migration.

In the storage system 2 of this forth embodiment, a target list generation unit 211 divides a volume in a data destination HDD 30 into multiple areas (n areas where n is a natural number greater than one), and generates intermediate list tables T2-4n for the respective area. Hereinafter, each of the divided areas is sometimes referred to as a "group". In addition, in this third embodiment, the multiple groups are identified by numbers (group numbers). Note that the group count used for the division is set by an operator, using an operation terminal 4, for example.

Note that, hereinafter, when a specific one of multiple group intermediate list tables should be referred to, reference symbols T2-41 to T2-4n are used, whereas reference symbol T2-4 is used when referring to any one of multiple group intermediate list tables.

In addition, the target list generation unit 211 divides a track information table T1 into n tables so as to relate them to the generated groups, and generates group intermediate list tables T2-41 to T2-4n by sorting, based on error evaluation values, the track information tables T1 for the respective divided groups (see FIG. 14A). In other words, each of the group intermediate list tables T2-4 is sorted according to error evaluation value in descending order.

A group intermediate list table T2-4 includes a table data section containing track usages and error evaluation values, and a table address section containing cylinder addresses and head addresses, as depicted in FIG. 14A.

The group intermediate list table T2-4 is generated by sorting the above-described track information table T1 according to error evaluation value in descending order. Note that, in the example depicted in FIG. 14A, the group intermediate list table T2-4 corresponds to the track information table T1 but the table address section and the table data section are replaced. Hereinafter, a group intermediate list table T2-4 is sometimes referred to as a "group intermediate list T2-4".

When a volume is divided in n areas, tracks constructing each divided area are not necessarily continuous. However, it is preferable that a volume is divided equally or substantially equally, that each area are constructing from continuous tracks, having the same or substantially same size (track count). This can facilitate generation of group intermediate list tables T2-4 from a track information table T1.

In the example depicted in FIG. 14A, tracks having the same cylinder number are grouped, and the respective group intermediate list tables T2-4 corresponding to Groups 0 to N are each constructed from tracks having the same cylinder.

The target list generation unit 211 then generates a target list table 4 by extracting tracks having error evaluation values greater than zero (error evaluation value 0) from the respective group intermediate list tables T2-4. Specifically, the target list generation unit 211 generates a target list table T3 by extracting tracks having error evaluation values greater than zero, and storing them in storage areas in the target list table T3.

If the sample count of the target list table T3 is not fulfilled with the extracted items having error evaluation values greater than zero in the group intermediate list table T2-4, the target list generation unit 211 then generates a group intermediate list table T2-5 based on the track information table T1.

The target list generation unit 211 generates intermediate list tables T2-5n based on track usage for the respective groups so as to relate them to the groups of the divided volume in a data destination HDD 30. Note that, hereinafter, when a specific one of multiple group intermediate list tables based on track usage should be referred to, reference symbols T2-51 to T2-5n are used, whereas reference symbol T2-5 is used when referring to any one of multiple group intermediate list tables.

A group intermediate list table T2-5 includes a table data section containing track usages and error evaluation values, and a table address section containing cylinder addresses and head addresses, as depicted in FIG. 15A.

The group intermediate list table T2-5 is generated by sorting an above-described group intermediate list table T2-4 according to track usage in descending order. Hereinafter, a group intermediate list table T2-5 is sometimes referred to as a "group intermediate list T2-5".

The target list generation unit 211 fills the target list table T3 by selecting items having greater track usages, in the order of track usage, from the highest, from the group intermediate list table T2-5 and storing the verification addresses of the selected items, until all empty table slots are filled.

At this process, items in the group intermediate list table T2-5 which have already been stored in the target list table T3 is rejected, such that the same verification address is not stored twice in the target list table T3.

As set forth above, the target list generation unit 211 also has a function as an intermediate list table generation unit that generates intermediate list tables T2-4 and T2-5.

Other than that, the storage system 2 in this fourth embodiment is configured similarly to the storage system 2 in the first embodiment, and any detailed description thereon will be omitted.

The method of generating a target list table T3 in the storage system 2 as the fourth embodiment will be described with reference to the flowchart (Steps F10 to F60) depicted in FIG. 16.

The target list generation unit 211 creates multiple (n) groups by dividing a volume in which migration data is stored (group division) (Step F10), and assigns group numbers 0 to n to these groups. In addition, the target list generation unit 211 obtains a track information table T1 from a RAM 202. In addition, the target list generation unit 211 also divides the obtained track information table T1 for the respective group revised so as to correspond to the groups.

The target list generation unit 211 generates group intermediate list tables T2-4 as many as the group count by sorting error evaluation value in order of error evaluation value for each of the track information tables T1 divided for each group (Step F20).

The target list generation unit 211 then extracts top items in each group intermediate list table T2-4, i.e., top pieces of track information having higher error evaluation values, and write their addresses to the target list table T3 (Step F30). Note that items having an error evaluation value of 0 are not written to the target list table T3.

Thereafter, the target list generation unit 211 checks whether or not the target list table T3 has any vacancy, i.e., whether or not verification addresses has been registered sufficient to the target list table T3 to fill the sample count (Step F40).

If the target list table T3 has any vacancy, i.e., the sample count is not fulfilled (see the YES route in Step F40), the target list generation unit 211 then generates group intermediate list tables T2-5 as many as the group count by sorting error evaluation value in order of track usage for each of the track information tables T1 divided for each group (Step F50). In this step, the target list generation unit 211 calculates the number of the deficit verification addresses by subtracting the number of verification addresses registered to the target list table T3 from the sample count of the target list table T3.

The target list generation unit 211 then extracts top items in the group intermediate list table T2-5, i.e., items having greater track usage from the top to obtain verification addresses to fill the deficit the target list table T3, and register them to the target list table T3 (Step F60). In this manner, the target list table T3 is generated.

Otherwise, of there is no vacancy in the target list table T3, i.e., the sample count is fulfilled (see the NO route in Step F40), the processing is terminated.

As described above, in accordance to the storage system 2 as the fourth embodiment, the same advantageous effects as those of the above-described third embodiment can be obtained. In addition, by generating a target list table T3 in which verification addresses having error evaluation values other than zero is selectively stored, data compare is selectively performed on tracks that have experienced error during data copy processing. This can improve the reliability.

(E) Fifth Embodiment

FIG. 17 is a diagram schematically illustrating an example of a hardware configuration of a storage system as one example of a fifth embodiment.

The storage system 2 as one example of this fifth embodiment also includes a data migration function to migrate data in a storage system 3 to a HDD 30 in the storage system 2, similar to the first embodiment, and additionally performs data copy processing and data compare processing upon executing such a data migration.

In the storage system 2 in this fifth embodiment, the CPU 201 in the CM 20 has a function as a determination unit 215. The determination unit 215 determines whether or not an error has occurred during a data copy for the data migration by the data copy control unit 111. For example, the determination unit 215 determines whether or not an error has occurred when there is a track having an error evaluation value other than zero in the track information table T1. For example, the value of error evaluation value enlisted in the track information table T1 can be evaluated by the sum for all tracks in the track information table T1. More specifically, if the sum is 0, it is determined that no error has occurred. In contrast, a determination that an error has occurred can be made if the sum is not zero.

The target list generation unit 211 selectively functions between a first mode to generate an intermediate list table T2-1 similar to that in the first embodiment for generating a target list table T3, and a second mode to generate an intermediate list tables T2-4 and T2-5 similar to that in the fourth embodiment for generating a target list table T3.

The selection between the first mode and the second mode is made by the determination by the determination unit 215 as of whether or not an error has occurred during a data copy for the data migration by the data copy control unit 111.

More specifically, in this fifth embodiment, the target list generation unit 211 operates in the first mode to generate an intermediate list table T2-1 for generating a target list table T3 if no error has occurred during data copy by the data copy control unit 111. Otherwise, if an error has occurred during data copy by the data copy control unit 111, the target list generation unit 211 operates in the second mode to generate intermediate list table T2-4 and T2-5 for generating a target list table T3.

Other than that, the storage system 2 in this fifth embodiment is configured similarly to the storage system 2 in the fourth embodiment, and any detailed description thereon will be omitted.

Figure 18:
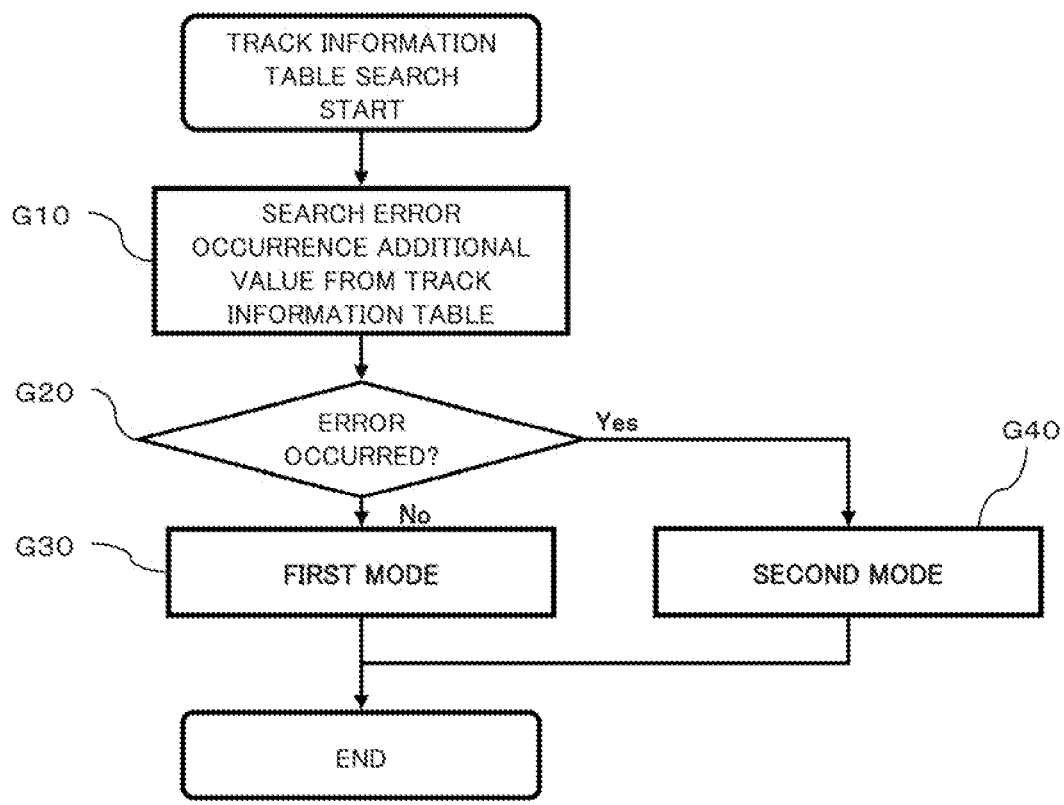
FIG. 18 is flowchart illustrating a method of generating a target list table in a storage system in the fifth embodiment.

The method of generating a target list table T3 in the storage system 2 in the fifth embodiment will be described with reference to the flowchart (Steps G10 to G40) depicted in FIG. 18.

The determination unit 215 obtains the track information table T1 from the RAM. 202, and checks whether or not there is any track having an error evaluation value other than zero in the track information table T1 (Step G10). In other words, the target list generation unit 211 checks whether or not an error has occurred during data copy processing by the data copy control unit 111 on the volume concerned (Step G20).

If it is determined in this check that no has occurred (see the NO route in Step G20), the target list generation unit 211 generates a target list table T3 in the first mode (Step G30) and the processing is terminated. In other words, the target list generation unit 211 generates the target list table T3 for the entire volume in the migration destination apparatus, and the selection unit 214 selects tracks enlisted in the target list table T3 as tracks to be inspected.

Otherwise, if it is determined that an error has occurred (see the YES route in Step G20), the target list generation unit 211 generates a target list table T3 in the second mode (Step G40) and the processing is terminated. In other words, the target list generation unit 211 generates the target list table T3 by extracting tracks to be inspected from each of multiple divided areas defined by dividing the volumes in migration destination apparatus into multiple areas. The selection unit 214 then selects tracks enlisted in this target list table T3 as tracks to be inspected.

As described above, according to the storage system 2 as the fifth embodiment, in addition to same the advantageous effects as those of the above-described fourth embodiment, since no intermediate list table T2-41 is needed to be generated based on error evaluation values if no error has occurred during data copy by the data copy control unit 111, the efficiency of the processing can be improved, thereby speeding up data compare processing.

(F) Others

By executing the data migration program by the CPU 101 in the CA 10 or the CPU 201 in the CM 20, any of the functions of the data copy control unit 111, the track usage calculation unit 112, the comparison unit 114, the error evaluation information generation unit 115, the track information generation unit 116, the cache control unit 212, the track information table generation unit 213, the selection unit 214, the determination unit 215, and the target list generation unit 211, described above, is embodied.

Note that programs (firmware) for implementing the functions as the data copy control unit 111, the track usage calculation unit 112, the comparison unit 114, the error evaluation information generation unit 115, the track information generation unit 116, the cache control unit 212, the track information table generation unit 213, the selection unit 214, the determination unit 215 and the target list generation unit 211 are provided in the form of programs recorded on a computer readable recording medium, such as, for example, a flexible disk, a CD (e.g., CD-ROM, CD-R, CD-RW), a DVD (e.g., DVD-ROM, DVD-RAM, DVD-R, DVD+R, DVD-RW, DVD+RW, HD-DVD), a Blu Ray disk, a magnetic disk, an optical disk, a magneto-optical disk, or the like. The computer then reads a program from that storage medium and uses that program after transferring it to the internal storage apparatus or external storage apparatus or the like. Alternatively, the program may be recoded on a storage device (storage medium), for example, a magnetic disk, an optical disk, a magneto-optical disk, or the like, and the program may be provided from to the storage device to the computer through a communication path.

Upon realizing the functions as the data copy control unit 111, the track usage calculation unit 112, the comparison unit 114, the error evaluation information generation unit 115, the track information generation unit 116, the cache control unit 212, the track information table generation unit 213, the selection unit 214, the determination unit 215 and the target list generation unit 211, programs stored in internal storage devices (the RAMs 102, 202 and the ROMs 104, 204 in this embodiment) are executed by a microprocessor in a computer (the CPUs 101, 201 in this embodiment). In this case, the computer may alternatively read a program stored in the storage medium for executing it.

Note that, in this embodiment, the term "computer" may be a concept including hardware and an operating system, and may refer to hardware that operates under the control of the operating system. Alternatively, when an application program alone can make the hardware to be operated without requiring an operating system, the hardware itself may represent a computer. The hardware includes at least a microprocessor, e.g., CPU, and means for reading a computer program recorded on a storage medium and, in this embodiment, the CA 10 and the CM include functions as a computer.

The disclosed technique is not limited to the embodiments described above, and various modifications may be made without departing from the spirit of the present embodiments.

For example, although the functions as the data copy control unit 111, the track usage calculation unit 112, the comparison unit 114, the error evaluation information generation unit 115, and the track information generation unit 116 are included in the CA in the embodiments described above, this is not limiting. In other words, at least a part of the functions may be performed by the CPU 201 in the CM 20.

Similarly, although the functions as the target list generation unit 211, the track information table generation unit 213, the selection unit 214, and the determination unit 215 are included in the CM 20, this is not limiting. At least a part of the functions may be performed by the CPU 201 in the CM 20.

In addition, although the track usage calculation unit 112 calculates track usage as information on how tracks are used in the above-described embodiment, this is not limiting. Track usage rates (data filling rates) may be used.

More specifically, a data filling rate can be determined by dividing a track usage as above described with the CKD track capacity. The track usage calculation unit 112 calculates track usage rates (data filling rates) using the following formula (A1):

Data filling rate(%)=track usage/track capacity TC (A)

Note that the track TC is the maximum amount of data (in bytes) to be written into a CKD track, and the track capacity TC=49728 in this embodiment.

Track usage rates are not necessarily represented by percentages, and simple rates may be used, for example.

Furthermore, although a track information table T1, intermediate list tables T2-1 to T2-5, and a target list table T3 are stored in the RAM 202 in the CM 20, this is not limiting. For example, the tables may be stored in a different storage, such as the RAM 102 in the CA 10 or the HDD 30.

According to the technique disclosed herein, an efficient data comparison can be achieved, thereby improving the reliability.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A processing apparatus including a data migration function from a migration source apparatus, comprising:
   a data copy control unit that controls a copy of data from the migration source apparatus;
   a unit storage area usage information calculation unit that calculates, during the copy of the data by the data copy control unit, an amount of usage of a unit storage area in a storage unit that stores the data transferred from the migration source apparatus, as unit storage area usage information;
   a target list generation unit that generates a target list in which the unit storage areas are ranked in accordance with the unit storage area usage information calculated by the unit storage area usage information calculation unit;
   a selection unit that selects the unit storage area to be verified according to the target list generated by the target list generation unit; and
   a comparison unit that compares data stored in the storage unit related to the unit storage area to be verified selected by the selection unit with data in the migration source apparatus related to the data to be verified.

2. The processing apparatus according to claim 1, wherein the selection unit selects a unit storage area that experiences an error during the copy processing of the data by the data copy control unit, as the unit storage area to be verified.

3. The processing apparatus according to claim 2, further comprising an error evaluation information generation unit that generates error evaluation information based on the error occurred during the copy processing of the data by the data copy control unit,
   wherein the selection unit preferentially selects the unit storage area experiencing the error, as the unit storage area to be verified, based on the error evaluation information.

4. The processing apparatus according to claim 1, wherein the selection unit selects the unit storage area to be verified for each of a plurality of divided areas which are generated by dividing storage areas of the migration destination apparatus into the plurality of divided areas.

5. The processing apparatus according to claim 1 wherein the selection unit selects the unit storage area to be verified for all storage areas in the storage unit.

6. The processing apparatus according to claim 1, further comprising a determination unit that determines whether or not an error occurs during the copy processing of the data by the data copy control unit,
wherein, if the determination unit determines that an error occurs, the selection unit selects the unit storage area to be verified for each of a plurality of divided areas which are generated by dividing storage areas of the storage unit into the plurality of divided areas, and
if the determination section unit that no error occurs during the copy of the data, the selection unit selects the unit storage area to be verified for all storage areas in the storage unit.

7. The processing apparatus according to claim 1, wherein the unit storage area usage information includes an amount of data of transfer data to be transferred from the migration source apparatus, and an amount of data of unit storage area control information to be used for controlling the transfer data in the storage unit.

8. The processing apparatus according to claim 1, wherein the selection unit preferentially selects a unit storage area having a greater the unit storage area usage, as the unit storage area to be verified.

9. A data migration method from a migration source apparatus to a migration destination apparatus, comprising:
copying data from the migration source apparatus to the migration destination apparatus data;
calculating an amount of usage of a unit storage area that stores data transferred from the migration source apparatus to the migration destination apparatus, as unit storage area usage information, during copy processing of the data by the copying data,
generating a target list in which the unit storage areas are ranked in accordance with the unit storage area usage information calculated in the calculating,
selecting a unit storage area to be verified according to the target list generated in the generating; and
comparing data in the migration destination apparatus related to the unit storage area to be verified selected in the selecting with data in the migration source apparatus related to the data to be verified.

10. The data migration method according to claim 9, wherein the selecting comprising selecting a unit storage area that experiences an error during the copying the data, as the unit storage area to be verified.

11. The data migration method according to claim 10, further comprising generating error evaluation information based on the error occurred during the copying the data,
wherein the selecting comprises preferentially selecting the unit storage area experiencing the error, as the unit storage area to be verified, based on the error evaluation information.

12. The data migration method according to claim 11, wherein the generating the error evaluation information comprises providing a weight based on a detail of error in the error evaluation information,
wherein the selecting comprises preferentially selecting the unit storage area experiencing the error having a greater weight, as the unit storage area to be verified, based on the error evaluation information.

13. The data migration method according to claim 9, wherein the selecting comprises selecting the unit storage area to be verified for each of a plurality of divided areas which are generated by dividing storage areas of the migration destination apparatus into the plurality of divided areas.

14. The data migration method according to claim 9, wherein the selecting comprises selecting the unit storage area to be verified for all storage areas in the migration destination apparatus.

15. The data migration method according to claim 9, further comprising determining whether or not an error occurs during the copying the data,
wherein, if it is determined that an error occurs during the copying the data, the selecting comprises selecting the unit storage area to be verified for each of a plurality of divided areas which are generated by dividing storage areas of the migration destination apparatus into the plurality of divided areas, and
if it is determined that no error occurs during the copying the data, the selecting comprises selecting the unit storage area to be verified for all storage areas in the migration destination apparatus.

16. The data migration method according to claim 9, wherein the unit storage area usage information includes an amount of data of transfer data to be transferred from the migration source apparatus, and an amount of data of unit storage area control information to be added used for controlling the transfer data in the migration destination apparatus.

17. The data migration method according to claim 9, wherein the selecting comprises preferentially selecting a unit storage area having a greater the unit storage area usage, as the unit storage area to be verified.

18. A computer-readable recording medium having a data migration program recorded thereon that makes a computer execute a data migration function that performs data migration from a migration source apparatus,
the data migration program making the computer to function as:
a data copy control unit that controls a copy of data from the migration source apparatus;
a unit storage area usage information calculation unit that calculates, during the copy of the data by the data copy control unit, an amount of usage of a unit storage area in a storage unit that stores the data transferred from the migration source apparatus, as unit storage area usage information;
a target list generation unit that generates a target list in which the unit storage areas are ranked in accordance with the unit storage area usage information calculated by the unit storage area usage information calculation unit;
a selection unit that selects the unit storage area to be verified according to the target list generated by the target list generation unit; and
a comparison unit that compares data stored in the storage unit related to the unit storage area to be verified selected by the selection unit with data in the migration source apparatus related to the data to be verified.

* * * * *